UNITED STATES PATENT OFFICE.

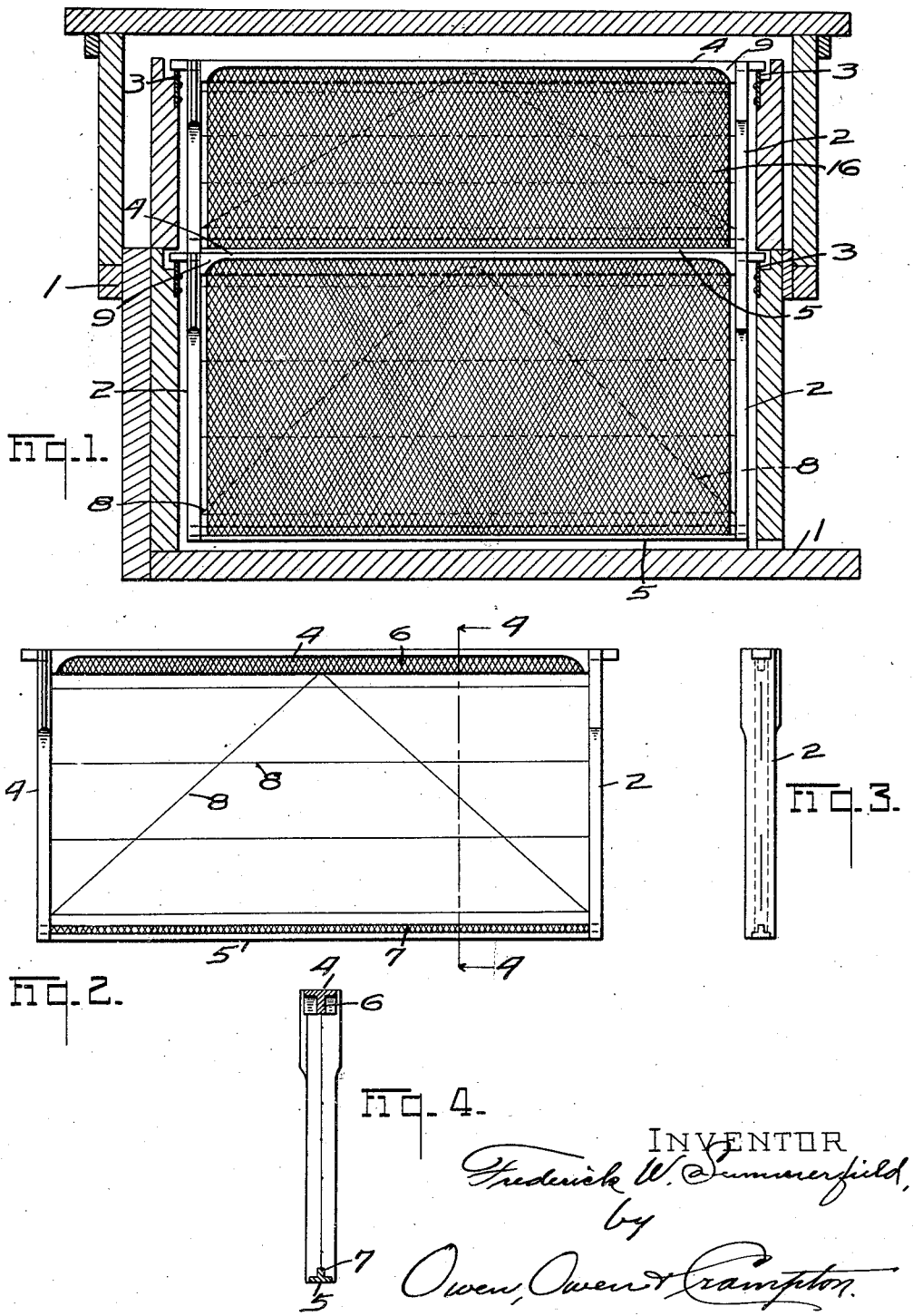

FREDERICK W. SUMMERFIELD, OF TOLEDO, OHIO.

BEEHIVE FRAME.

1,425,295.  Specification of Letters Patent.  Patented Aug. 8, 1922.

Application filed February 21, 1921. Serial No. 446,828.

*To all whom it may concern:*

Be it known that I, FREDERICK W. SUMMERFIELD, a citizen of the United States, and a resident of Toledo, in the county of Lucas and State of Ohio, have made an Invention Appertaining to Beehive Frames; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a frame for supporting the honey deposited by bees, that will give an increased area for the deposition of the honey of the bees within any given size, and yet be of sufficient strength to support the honey. The invention particularly has for its object to provide a frame that may be used as a part of a double brooding frame that will not disturb the bees when crossing from one brooding frame to another, and yet wherein the brooding frame will have sufficient strength to support the comb and honey formed and deposited thereon. The invention also has for its object other features and advantages that will appear from the following description.

To illustrate a practical application of the invention I have selected two or three forms of frames that contain my invention as examples, and shall describe them hereinafter. The frames selected for purposes of illustration are shown in the accompanying drawings.

Figure 5:
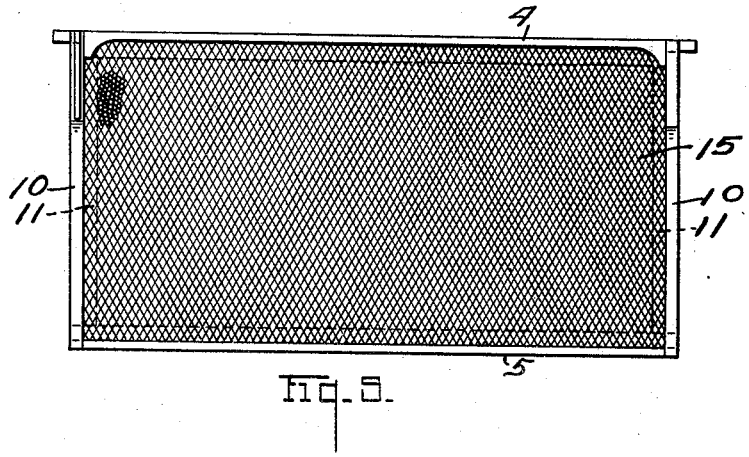
Figure 6:
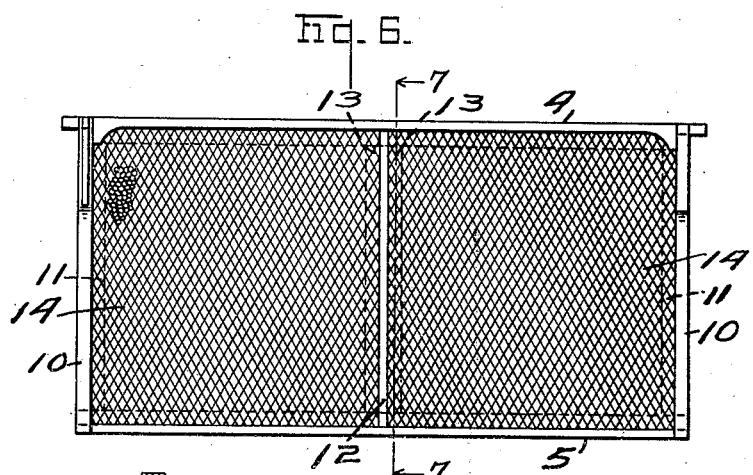
Figure 7:
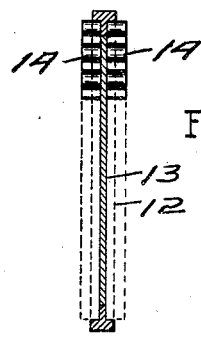

Figure 1 of the drawings is a sectional view of a hive, and a side view of a super-frame and a brooding frame. The figure may also be used to illustrate a double brooding frame, provided the supers are placed above the upper frame shown. Fig. 2 illustrates a side view of the frame, the wax forming the foundation of the comb being shown removed. Fig. 3 is an edge view of the frame. Fig. 4 is a sectional view taken on the line 4—4 indicated in Fig. 2. Fig. 5 is a front view of a frame having a celluloid comb formed ready for the deposition of honey by the bees. Fig. 6 is a modification of the frame shown in Fig. 5 whereby the frame is greatly strengthened without materially reducing the area of the frame. Fig. 7 is a sectional view of the frame shown in Fig. 6 taken on the line 7—7 indicated in Fig. 6.

1 indicates the bee-hive structure which is of any of the well known forms. The frames 2 are supported in the hive in the manner well known in the art, as by the metal strips 3 on which rest the ends of the top bars 4 of the frames, and so that the super-frames extend upward in vertical planes. The two frames shown in Fig. 1 may be used as brooding frames, in which case the bees will start to build in the center at the top of the frame, and work down towards the lower frame. The frames, in order to give them strength to support the honey that is deposited on the wax, are usually formed of wood of considerable thickness and width, but it has been found that the bees are disturbed when they reach the lower side of the upper frame because of the fact that in many cases they refuse to cross the double width of the strips forming the bottom bar of the upper frame and the top bar of the lower frame. This often results in a loss of a great many pounds of bees in a single season. I have eliminated this loss by cutting away a portion of the top and bottom bars, and leaving webs or flanges along the center lines of the top and bottom bars of the frames, on which the bees build, and consequently attach or unite, through the medium of the wax of the comb, the bars with the body portion of the comb located in the center portion of the frame, that is, located within the area of the top, bottom and side bars of the frame.

As shown in the drawings, the top and bottom bars 4 and 5 have portions cut out so as to leave the webs 6 and 7. This forms a T shaped cross section which is quite as strong in transverse directions as the bar was originally, that is, before the portions were cut out, and will, moreover, carry quite as great a load of honey as it did before the portions were removed. This, moreover, greatly decreases the width of the parts of the two bars that have to be crossed by the bees to get from one frame to the other, and consequently the bees are undisturbed and will continue to follow their usual method or habit of building straight across the bars without being excited by the change in foundation on which the cells are built.

The upper bars being the supporting bars of the frame, by reason of the fact that the frames are supported on the ends of the bars, they must necessarily be the strongest bars of the frame. Consequently I find it desirable to slightly bow the upper bar upward at the center in order that the load of the honey which has its greatest effect on the bar at the center, may be sustained. The frames may be provided with the reinforcing or stay wires 8, a provision that is well known and commonly used in the art for transferring the load to the side bars of the frame. The diagonal wires 8 pass from the center of the top bar to the lower corners of the frame, and consequently the central portion of the top bar carries considerable part of the load of honey deposited on the frame. The web 6, however, gives substantially the same strength to the top bar as it would have if the top bar were made solid instead of T shaped. The end portions 9 of the top bars 4 are, however, made solid near the side bars, and the spaces formed by the removal of the portions of the top bar to change it into a T shaped bar are defined by curved spaces that extend from the bottom sides of the top bars to near the top sides of the top bars 4. This gives a good attaching body for securing the side bars 2 to the top bar, and consequently provides a means for making the frame strong at the upper corners thereof.

The web 6 of the top bar 4 may be pressed with a suitable die on both sides thereof so as to form hexagonal depressions of substantially the same size as the cross section of the cells of the cone, and then melted wax may be painted over the sides of the web 6, and the bees will build on the web 6. Also, if desired, the web 6 may be painted with melted wax, and with a suitable die, the wax may be provided with a plurality of depressions over its surface, which also will cause the bees to build on the top bar. This also may be done on the web 7 of the bottom bar, which will also cause the bees to build onto the web of the bottom bar. Where the frames adjoin at their edges, bees, in building from the top frame to the lower frame, will only meet with the very narrow strip forming the top of the T's into which the adjoining bars are formed, and they will readily pass from one frame to the other without being disturbed. Moreover, the area in which the honey may be deposited on the frame is greatly increased, which amounts to a considerable saving even in a single bee-hive.

Where celluloid cells are used the celluloid comb may be secured in the frame by forming on the side bars 10, webs 11 similar to those formed on the top and bottom bars of the frame shown in Fig. 2. The celluloid comb may be secured in position by cutting a slot that will extend along the sides and the top and the bottom of the comb, and cutting off the upper corners of the comb, and then sliding the comb between the side bars 10 until it is penetrated by the web 6 of the top bar 4. The lower bar 5 may then be nailed or secured to the side bars 10, whereupon the comb will be secured in position. On account of the fact that the load will be larger in the center of the frame, and will, in a large measure, be supported by the bottom bar 5 instead of by the top bar 4, I preferably connect the bottom bar 5 with the top bar 4 by means of a vertical strip 12 having flanges 13 that extend in opposite directions and within the plane of the frame. This divides the frame area into two parts. The combs 14 of the frame may be secured in position in the same way that the comb 15 of the frame shown in Fig. 5 is secured, that is, they may be slotted around their sides and slid into position between the side bars 14 and the central bar 12, and then secured in position by nailing the ends of the bottom bar 5 to the side bars 10 and to the central bar 12.

I claim:

1. In a bee-hive frame consisting of top, bottom and side bars, one of the bars having a T cross section for supporting a comb on the web of the T, the web of the T having cell starting depressions.

2. In a bee-hive frame consisting of top, bottom and side bars, a plurality of the bars having a T cross section for supporting a comb on the web portions of the bars, the webs of the bars having cell starting depressions.

3. In a bee-hive construction a frame having top, bottom and side bars, a bar connecting the top and bottom bars and located between the side bars, the said bars having flanges, combs supported by the bars and secured in position by the flanges the flanges having cell starting depressions.

In testimony whereof, I have hereunto signed my name to this specification.

FREDERICK W. SUMMERFIELD.